(12) United States Patent
Kim et al.

(10) Patent No.: US 9,287,550 B2
(45) Date of Patent: Mar. 15, 2016

(54) RECHARGEABLE BATTERY

(71) Applicants: SAMSUNG SDI CO., LTD., Yongin-si, Gyeonggi-do (KR); ROBERT BOSCH GMBH, Stuttgart (DE)

(72) Inventors: Duk-Jung Kim, Yongin-si (KR); Jong-Seok Moon, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/849,462

(22) Filed: Mar. 22, 2013

(65) Prior Publication Data

US 2013/0330593 A1    Dec. 12, 2013

Related U.S. Application Data

(60) Provisional application No. 61/658,195, filed on Jun. 11, 2012.

(51) Int. Cl.
*H01M 2/30* (2006.01)
*H01M 2/26* (2006.01)
*H01M 10/04* (2006.01)
*H01M 10/0525* (2010.01)
*H01M 10/0585* (2010.01)
*H01M 10/0587* (2010.01)

(52) U.S. Cl.
CPC ........ *H01M 2/30* (2013.01); *H01M 2/26* (2013.01); *H01M 10/0413* (2013.01); *H01M 10/0431* (2013.01); *H01M 10/0525* (2013.01); *H01M 10/0585* (2013.01); *H01M 10/0587* (2013.01); *Y02T 10/7011* (2013.01)

(58) Field of Classification Search
CPC ........................................ H01M 2/30
USPC ................................. 429/149, 179
See application file for complete search history.

(56) References Cited

U.S. PATENT DOCUMENTS

| | | | |
|---|---|---|---|
| 2006/0024572 A1* | 2/2006 | Lee | 429/161 |
| 2006/0051664 A1* | 3/2006 | Tasai et al. | 429/161 |
| 2007/0117009 A1* | 5/2007 | Yamauchi et al. | 429/160 |
| 2010/0227211 A1* | 9/2010 | Chang et al. | 429/152 |
| 2012/0189899 A1* | 7/2012 | Kanda et al. | 429/153 |
| 2012/0196166 A1* | 8/2012 | Kim | 429/94 |

FOREIGN PATENT DOCUMENTS

| | | |
|---|---|---|
| KR | 10-2010-0102542 | 9/2010 |
| KR | 10-2011-005764 | 6/2011 |
| WO | WO 2011/099491 A1 | 8/2011 |

OTHER PUBLICATIONS

EPO Search Report dated Sep. 20, 2013, for corresponding European Patent application 13166347.8, (10 pages).

* cited by examiner

*Primary Examiner* — Karie O'Neill Apicella
(74) *Attorney, Agent, or Firm* — Lewis Roca Rothgerber Christie LLP

(57) ABSTRACT

A rechargeable battery includes an electrode assembly including a positive electrode and a negative electrode, each of the positive and negative electrodes including a coated region and an uncoated region at an end of the coated region in a longitudinal direction of the electrode assembly, a case housing the electrode assembly, a terminal coupled to the electrode assembly, and a current collecting member electrically coupling the electrode assembly to the terminal, wherein the uncoated region is fixed to the current collecting member, and includes a portion that is substantially perpendicular to the longitudinal direction of the electrode assembly.

12 Claims, 15 Drawing Sheets

RECHARGEABLE BATTERY

CROSS-REFERENCE TO RELATED APPLICATION

This application claims priority to and the benefit of U.S. Provisional Application No. 61/658,195, filed on Jun. 11, 2012, in the U.S. Patent and Trademark Office, the entire content of which is incorporated herein by reference.

BACKGROUND (a) Field

Embodiments of the present invention relate to a rechargeable battery.

(b) Description of the Related Art

A rechargeable battery can be repeatedly charged and discharged, unlike a primary battery, which is not designed to be recharged. A rechargeable battery having low capacity may be used for small portable electronic devices, such as mobile phones, laptop computers, and camcorders. Large capacity batteries are widely used as a power source for driving things such as motors of hybrid vehicles, etc.

Nowadays, a high power rechargeable battery using a non-aqueous electrolyte of high energy density has been developed, and the high power rechargeable battery is formed to have a large capacity by coupling a plurality of rechargeable batteries in series to drive a motor of a device, for example, an electric vehicle requiring large amounts of electric power.

Further, a battery module may have a plurality of rechargeable batteries that are coupled in series, the rechargeable batteries being, for example, cylindrically shaped or rectangularly shaped.

It is useful that such a battery module has a large capacity in a limited volume, as a volume of the battery module may impact performance of a device in which the battery module is mounted.

Further, when the battery module is mounted in an electric vehicle, vibration and impact are transferred to the battery module, and thus the battery module should have a structure capable of withstanding vibration and impact.

The above information disclosed in this Background section is only for enhancement of understanding of the background of embodiments of the invention and therefore it may contain information that does not form the prior art that is already known in this country to a person of ordinary skill in the art.

SUMMARY

Embodiments of the present invention provide a rechargeable battery having improved safety features.

An exemplary embodiment of the present invention provides a rechargeable battery including an electrode assembly including a positive electrode and a negative electrode, each of the positive and negative electrodes including a coated region and an uncoated region at an end of the coated region in a longitudinal direction of the electrode assembly, a case housing the electrode assembly, a terminal coupled to the electrode assembly, and a current collecting member electrically coupling the electrode assembly to the terminal, wherein the uncoated region is fixed to the current collecting member, and includes a portion that is substantially perpendicular to the longitudinal direction of the electrode assembly.

Another exemplary embodiment of the present invention provides a rechargeable battery including a plurality of electrode assemblies each including a positive electrode and a negative electrode, each of the positive and negative electrodes including a coated region and an uncoated region at an end of the coated region in a longitudinal direction of the electrode assembly, a case housing the electrode assembly, a terminal coupled to the electrode assembly, and a current collecting member electrically coupling the electrode assembly to the terminal, wherein the current collecting member includes a side plate extending in a direction substantially perpendicular to the longitudinal direction of the electrode assemblies, and a support plate coupled to the side plate and substantially parallel to the side plate, and wherein the uncoated region is bent with respect to the longitudinal direction of the electrode assembly, and coupled to the support plate.

The uncoated region may be welded to the support plate.

The uncoated region may include an inclined surface at an end of one of the electrodes of one of the electrode assemblies, a first extension extending from a peak of the inclined surface in the longitudinal direction of the electrode assembly, and a second extension extending from the first extension in a direction substantially perpendicular to the longitudinal direction of the electrode assembly.

The support plate may be bent from the side plate, and the support plate and the side plate may be integrally formed.

The support plate and the side plate may form a tube having a substantially rectangular cross-section.

The current collecting member may further include a terminal connection portion having a hole for accommodating the terminal.

The terminal connection portion may extend from the side plate in a direction substantially perpendicular to the side plate, substantially perpendicular to the support plate, and substantially parallel to the longitudinal direction of the electrode assembly.

The terminal connection portion, the side plate, and the support plate may be integrally formed.

The side plate may have an opening.

The opening of the side plate may be substantially rectangular and may extend in a longitudinal direction of the side plate.

The support plate may include a first portion coupled to a first side of the side plate, and a second portion coupled to a second side of the side plate opposite the first side, wherein the first portion is bent from the side plate to be substantially parallel to the side plate, and wherein the second portion is bent from the side plate to be substantially parallel to the side plate and to substantially overlap the first portion.

The side plate may include a first prong and a second prong, wherein the support plate includes a first support plate coupled to and bent from the first prong to form a tube-like structure with the first prong, and a second support plate coupled to and bent from the second prong to form a tube-like structure with the second prong.

According to an embodiment of the present invention, output power per volume can be increased by reducing or minimizing the space occupied by uncoated regions and current collecting members.

DETAILED DESCRIPTION

Figure 1:
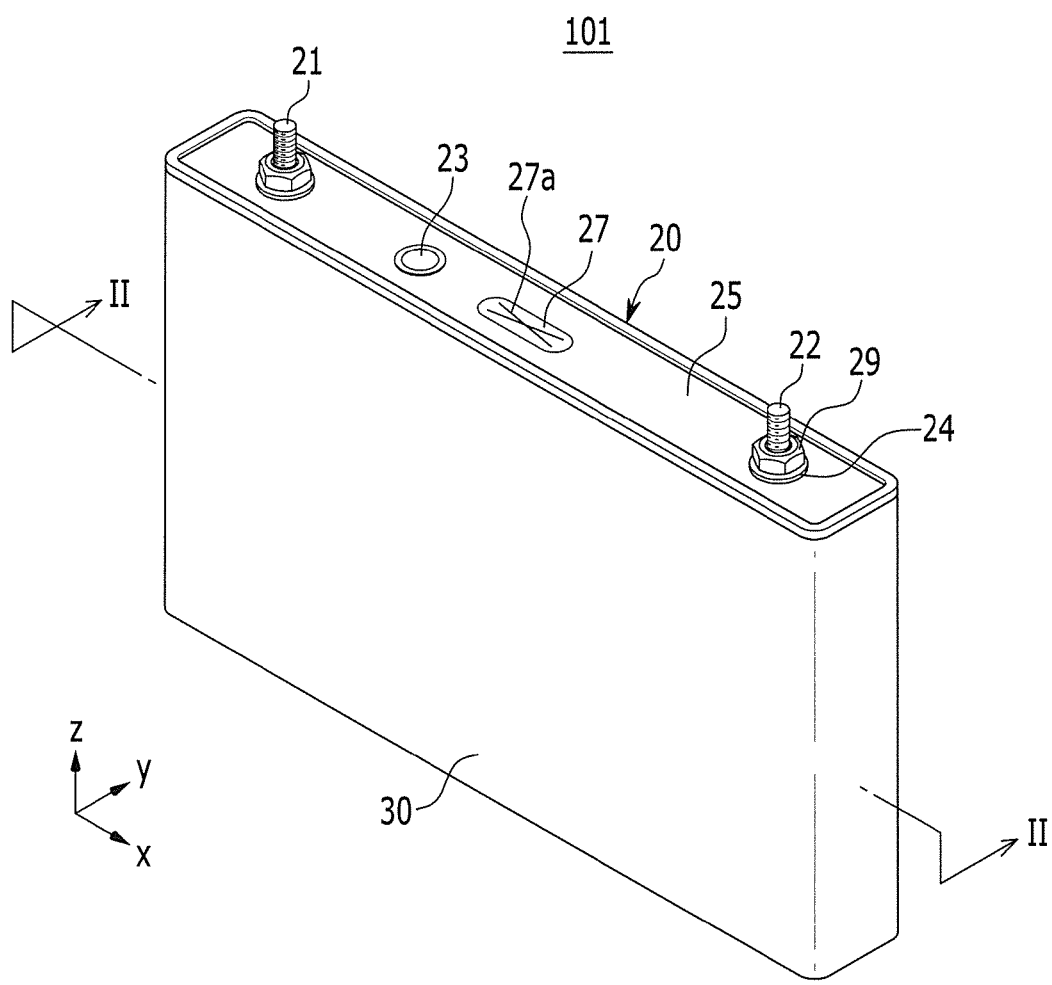
FIG. 1 is a perspective view illustrating a rechargeable battery according to a first exemplary embodiment of the present invention.

Embodiments of the present invention will be described more fully hereinafter with reference to the accompanying drawings, in which exemplary embodiments of the invention are shown. As those skilled in the art would realize, the described embodiments may be modified in various ways, all without departing from the spirit or scope of the present invention. Also, like reference numerals designate like elements throughout the specification and the drawings.

Figure 2:
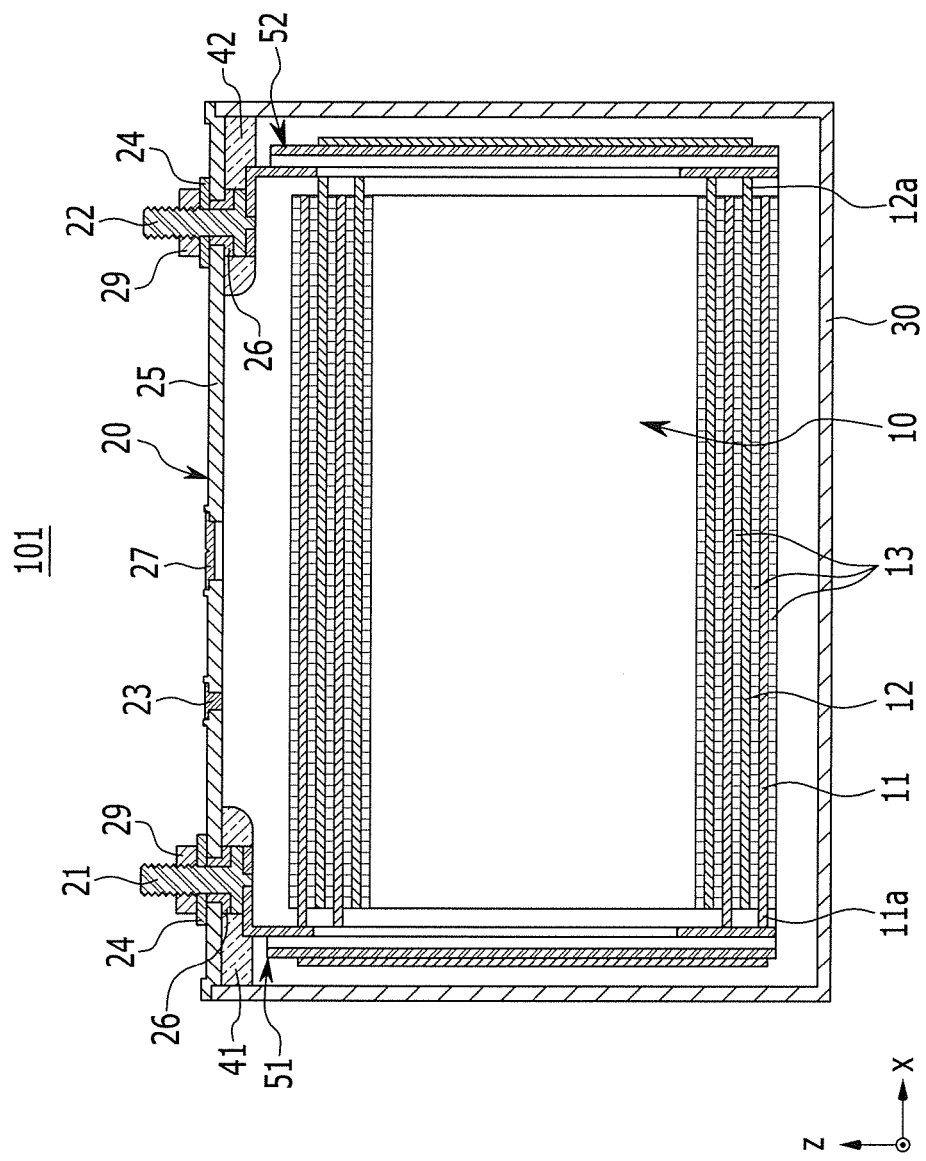
FIG. 2 is a cross-sectional view of the rechargeable battery of the embodiment shown in FIG. 1 taken along the line II-II of FIG. 1.

FIG. 1 is a perspective view illustrating a rechargeable battery according to a first exemplary embodiment of the present invention, and FIG. 2 is a cross-sectional view of the rechargeable battery shown in FIG. 1 taken along the line II-II.

Referring to FIGS. 1 and 2, a rechargeable battery 101 according to the first exemplary embodiment includes an electrode assembly 10 formed by spiral-winding a positive electrode 11 and a negative electrode 12 with a separator 13 therebetween, a case 30 that houses the electrode assembly 10, and a cap assembly 20 coupled to the case 30 at an opening of the case 30.

The rechargeable battery 101 according to the first exemplary embodiment illustrates a rectangularly shaped lithium ion rechargeable battery. However, the present invention is not limited thereto, and embodiments of the present invention may include a battery of various forms such as, for example, a lithium polymer battery or a cylindrical battery.

The positive electrode 11 and the negative electrode 12 include coating regions in which an active material is applied to a current collector formed with thin plate metal foil, and uncoated regions 11a and 12a in which an active material is not applied.

The positive uncoated region 11a is formed at a side end of the positive electrode 11 in a length direction of the positive electrode 11, and the negative uncoated region 12a is formed at a side end of the negative electrode 12 in a length direction of the negative electrode 12 and opposite the side end of the positive electrode. The positive electrode 11 and the negative electrode 12 are spiral-wound about a winding axis L1 with the separator 13, which is an insulator interposed therebetween. The electrode assembly 10 is spiral-wound and is flatly pressed to have a wide front surface. The front surface is parallel to the winding axis L1. However, the present invention is not limited thereto, and the electrode assembly 10 may be formed in a structure in which a positive electrode and a negative electrode formed with a plurality of sheets are stacked with a separator therebetween.

The case 30 is formed in an approximately cuboid shape, and has an opening at one surface thereof, while a plurality of electrode assemblies 10 are inserted into the case 30.

The cap assembly 20 includes a cap plate 25 that covers an opening of the case 30, a positive terminal 21 protruding outside of the cap plate 25 and electrically coupled to the positive electrode 11, a negative terminal 22 protruding outside of the cap plate 25 and electrically coupled to the negative electrode 12, and a vent member 27 that has a notch 27a configured to tear or break due to internal pressure (e.g., according to a predetermined internal pressure).

The cap plate 25 is formed in a thin metal plate, has an electrolyte injection opening for injecting an electrolyte solution at one side thereof, and a seal stopper 23 for sealing the electrolyte injection opening.

The positive terminal 21 penetrates the cap plate 25. A first gasket 24 positioned at an upper part between the cap plate 25 and the positive terminal 21, and a second gasket 26 positioned at a lower part between the cap plate 25 and the positive terminal 21, insulate the cap plate 25 and the positive terminal 21.

The positive terminal 21 is formed in a circular cylindrical shape, a nut 29 that supports the positive terminal 21 at an upper part is installed in the positive terminal 21, and a screw thread for fastening the nut 29 is formed at an external circumference of the positive terminal 21.

The positive terminal 21 is electrically coupled to the positive uncoated region 11a using a positive current collecting member 51 as an intermediary, and a terminal flange that supports the positive terminal 21 and the positive current collecting member 51 is formed at a lower end of the positive terminal 21.

The negative terminal 22 is installed to penetrate the cap plate 25. The first gasket 24 positioned at an upper part between the cap plate 25 and the negative terminal 22, and the second gasket 26 positioned at a lower part between the cap plate 25 and the negative terminal 22, insulate the cap plate 25 and the negative terminal 22.

The negative terminal 22 is formed in a circular cylindrical shape, the nut 29 that supports the negative terminal 22 at an upper part is installed in the negative terminal 22, and a screw thread for fastening the nut 29 is formed at an external circumference of the negative terminal 22.

The negative terminal 22 is electrically coupled to the negative uncoated region 12a using a negative current collecting member 52 as an intermediary, and a terminal flange that supports the negative terminal 22 and the negative current collecting member 52 is formed at a lower end of the negative terminal 22.

Figure 3:
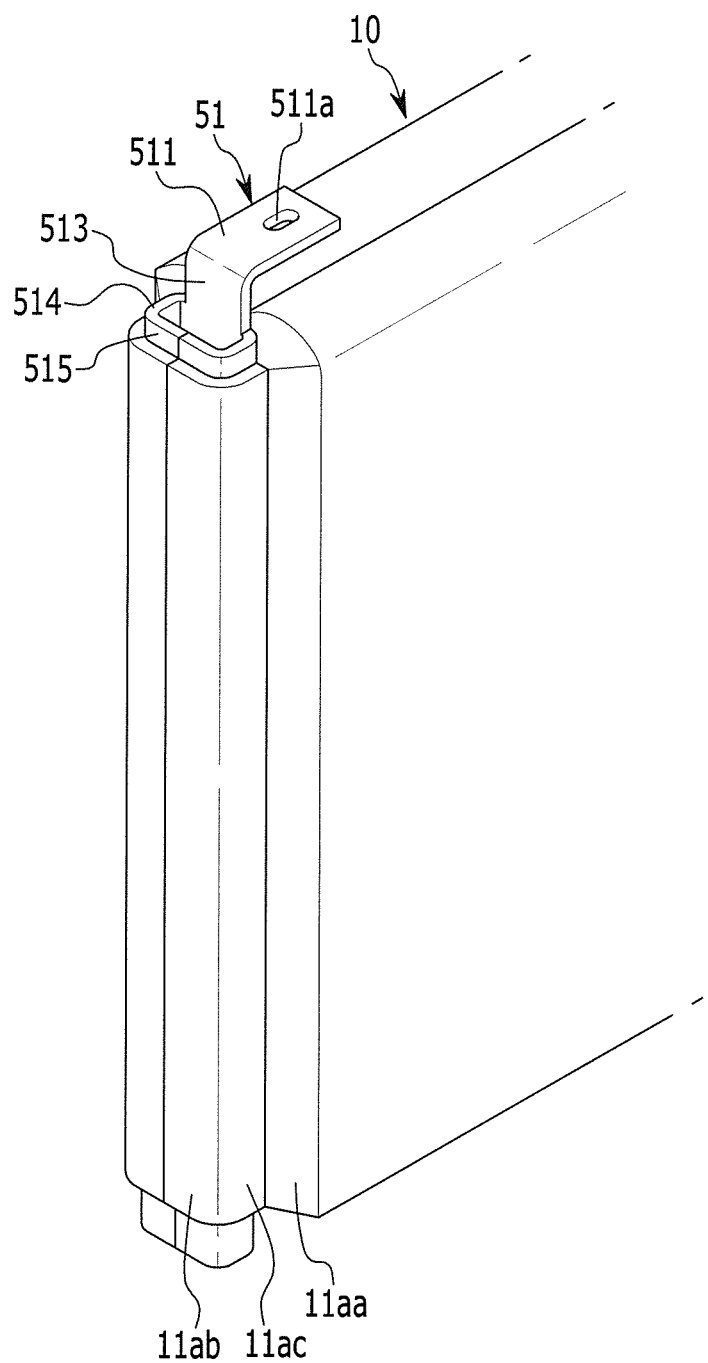
FIG. 3 is a perspective view illustrating a coupling state of a positive electrode current collecting member and an electrode assembly according to the first exemplary embodiment of the present invention.
Figure 4:
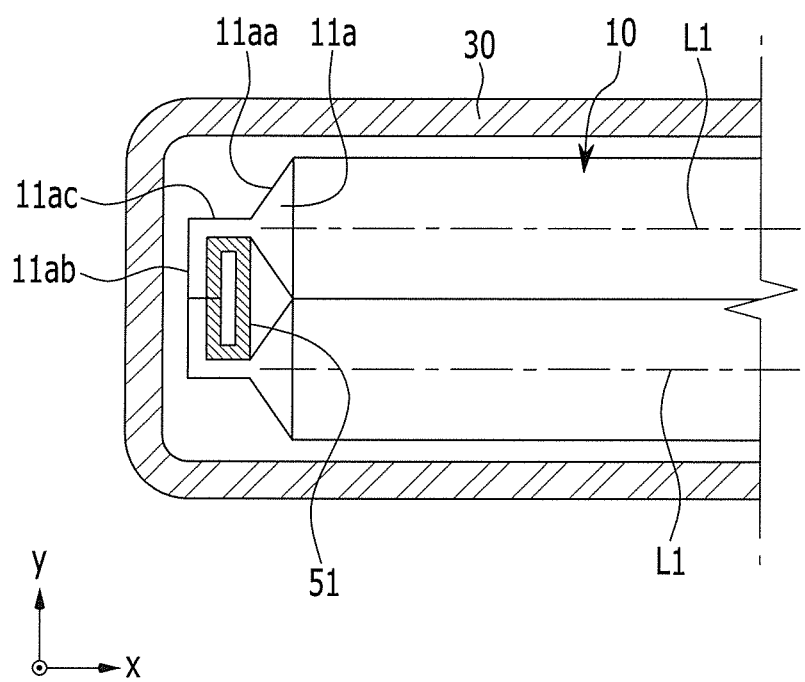
FIG. 4 is a transverse cross-sectional view illustrating a portion of the rechargeable battery shown in FIG. 1 according to the first exemplary embodiment of the present invention.

FIG. 3 is a perspective view illustrating a coupling state of a positive electrode current collecting member and an electrode assembly according to the first exemplary embodiment of the present invention, and FIG. 4 is a transverse cross-sectional view illustrating a portion of a rechargeable battery according to the first exemplary embodiment of the present invention.

Referring to FIGS. 3 and 4, the positive electrode current collecting member 51 includes a terminal connection portion 511 fixed to the positive terminal 21, a side plate 513 bent from the terminal connection portion 511, a connection plate 514 bent from the side plate 513, and a support plate 515 bent from the connection plate 514.

The terminal connection portion 511 is formed in a quadrangular plate shape, and a hole 511a, through which a protrusion formed in a lower portion of the positive terminal 21 is inserted, is in the center of the terminal connection portion 511. Further, the terminal connection portion 511 is bonded to a lower portion of the positive terminal 21 by, for example, welding.

The side plate 513 is bent orthogonally toward the bottom of the case 30 at an end portion of a length direction of the terminal connection portion 511. The side plate 513 is coupled in a height direction of the case 30, and is parallel to a side surface of the case 30. A hole is formed in the side plate 513 (e.g., in a height direction). Further, the side plate 513 is between the electrode assemblies 10 and is vertical and in a direction perpendicular to the winding axis L1 of the electrode assembly 10 (the winding axis being the x-axis direction of FIG. 4) to be parallel to a stacking direction (y-axis direction of FIG. 4) of the electrode assembly 10. However, the present invention is not limited thereto, and the side plate 513 may cross the winding axis L1.

The connection plate 514 is coupled to both side ends of the side plate 513, and is bent vertically toward a side surface of the case 30 from the side plate 513. Accordingly, the connection plate 514 is parallel to the winding axis L1. The support plate 515 is bent from the connection plate 514 to cross a direction of a wide front surface of the electrode assembly 10, and end portions of the support plate 515 bent from both sides of the connection plate 514 come in contact and are supported by each other. Accordingly, the support plate 515 is in a direction that crosses the winding axis L1.

In the present exemplary embodiment, the support plate 515 is bent from the side plate 513 with the connection plate 514 acting as an intermediary, but the present invention is not limited thereto, and the support plate 515 may be directly coupled to the side plate 513 and bent therefrom. Further, the support plate 515 is bent vertically from the connection plate 514 to be parallel to the side plate 513, but the present invention is not limited thereto.

The positive uncoated region 11a is fixed to the connection plate 514 and the support plate 515 (e.g., by welding). The positive uncoated region 11a includes an inclined surface 11aa that is formed obliquely toward the center of a width direction of the electrode assembly 10, a first extension 11ac that is parallel to the winding axis L1, that couples the inclined surface 11aa and a second extension 11ab, and that is attached to the connection plate 514, and the second extension 11ab, which is attached to the support plate 515 and bent from the first extension 11ac and the inclined surface 11aa to cross the winding axis L1. The second extension 11ab is bent vertically to the winding axis L1, crosses a direction of a wide front surface of the electrode assembly, and is parallel to a side surface of the case 30.

Further, the second extension 11ab of the adjacent electrode assembly 10 is bent toward the positive uncoated region 11a of the neighboring electrode assembly 10, and end portions of the second extensions 11ab are coupled together.

As described above, according to the present exemplary embodiment, a portion that is coupled to the positive uncoated region 11a in the positive electrode current collecting member 51 is formed in a pipe shape having a substantially rectangular cross-section formed by the side plate 513, the connection plate 514, and the support plate 515. Further, the positive uncoated region 11a is installed to enclose the connection plate 514 and the support plate 515.

In the present exemplary embodiment, when the bent support plate 515 is provided, a contact area of the positive electrode current collecting member 51 and the positive uncoated region 11a is enlarged, thereby stably fixing the electrode assembly 10. Further, by reducing size of the positive electrode current collecting member 51, output per volume can be improved. A conventional uncoated region protrudes in a direction of a winding axis, and a current collecting member is parallel to the uncoated region, and according to such a structure, space corresponding to a protruded length of the uncoated region would occupy volume, potentially leading to an increase in volume of the battery. However, according to the present exemplary embodiment, by reducing occupying space of the positive uncoated region 11a and the positive electrode current collecting member 51, output per volume is remarkably improved.

Further, as shown in FIG. 4, the positive uncoated region 11a has a second extension 11ab that is bent toward the inclined surface 11aa and a first extension 11ac protruding in a direction of the winding axis L1 and that couples the inclined surface 11aa and the second extension 11ab. Because the second extension 11ab and the first extension 11ac are fixed to the positive electrode current collecting member 51, the positive uncoated region 11a is supported by the positive electrode current collecting member 51 in two directions to prevent poor contact of the positive uncoated region 11a and the positive electrode current collecting member 51 due to vibration or impact.

Figure 5:
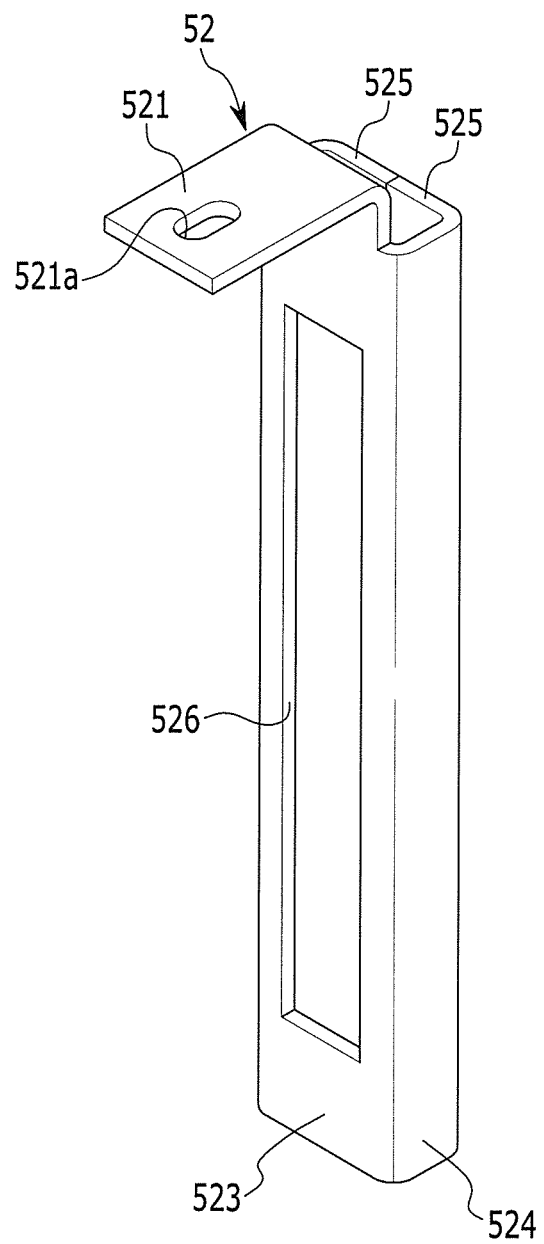
FIG. 5 is a perspective view illustrating a negative electrode current collecting member according to the first exemplary embodiment of the present invention.

FIG. 5 is a perspective view illustrating a negative electrode current collecting member according to the first exemplary embodiment of the present invention.

Referring to FIG. 5, the negative electrode current collecting member 52 includes a terminal connection portion 521 that is fixed to the negative terminal 22, a side plate 523 that is bent from the terminal connection portion 521, a connection plate 524 that is bent from the side plate 523, and a support plate 525 that is bent from the connection plate 524.

The terminal connection portion 521 is of a quadrangular plate shape, and a hole 521a, which is for inserting a protrusion of a lower portion of the positive terminal 21, is formed at the center thereof. Further, the terminal connection portion 521 is bonded (e.g., bonded by welding) to a lower portion of the positive terminal 21. The side plate 523 is formed in a height direction of the case 30, and a hole 526 is formed in the side plate 523 (e.g., at a height direction).

The negative electrode current collecting member 52 according to the present embodiment is formed in the same structure as that of the positive electrode current collecting member 51, and thus a detailed description of structure the same as that of the positive electrode current collecting member 52 will be omitted.

Figure 6A:
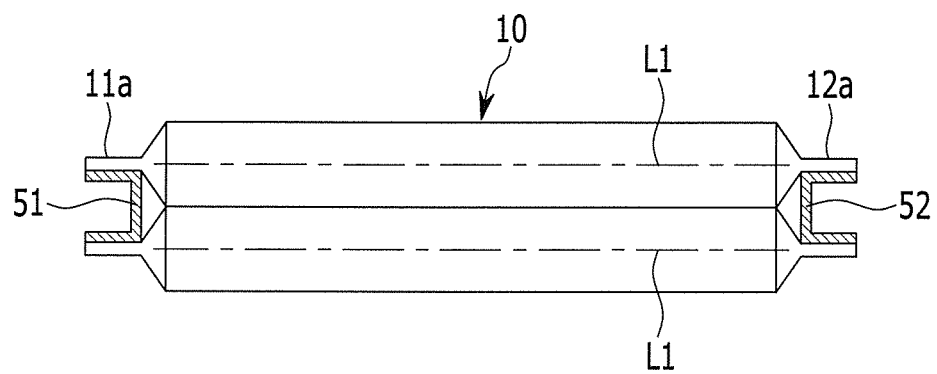
FIG. 6A is a cross-sectional view of the rechargeable battery according to the first exemplary embodiment of the present invention, illustrating a state in which a current collecting member is coupled to an uncoated region.
Figure 6B:
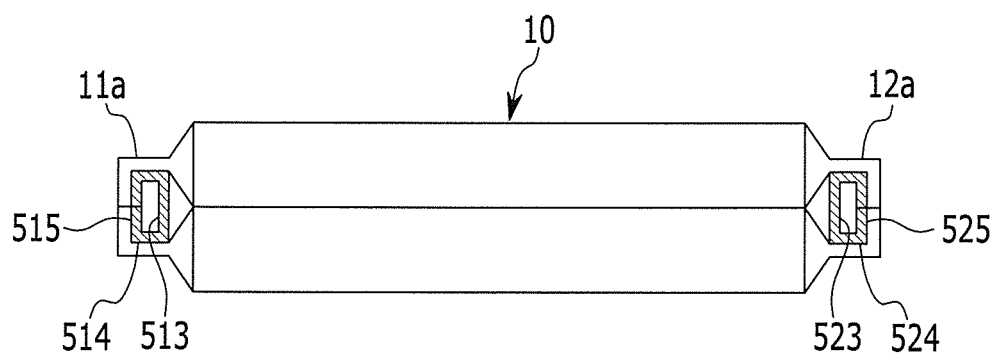
FIG. 6B is a cross-sectional view of the rechargeable battery according to the first exemplary embodiment of the present invention, illustrating a state in which a current collecting member is bent.

FIG. 6A is a cross-sectional view illustrating a state in which a current collecting member is coupled to an uncoated region, and FIG. 6B is a cross-sectional view illustrating a state in which a current collecting member is bent.

A method of installing a current collecting member according to the present embodiment will be described with reference to FIGS. 6A and 6B. The method of installing current collecting members 51 and 52 according to the present exemplary embodiment includes respectively inserting the current collecting members 51 and 52 between the uncoated regions 11a and 12a of the neighboring electrode assembly 10, respectively bonding the uncoated regions 11a and 12a to protrusions bent at both side ends of the side plates 513 and 523, and adjusting protruding angles of the protrusions.

At a step of inserting, the side plates 513 and 523 are respectively inserted between the uncoated regions 11a and 12a, and protrusions at both side ends of the side plates 513 and 523 closely contact respective ones of the uncoated regions 11a and 12a. In this case, the protrusions are parallel to the uncoated regions 11a and 12a and the winding axis L1.

At a step of bonding, the uncoated regions 11a and 12a and the respective protrusions are bonded (e.g., bonded with ultrasonic welding and/or resistance welding). Next, at a step of adjusting a protruding angle, by bending an opposite protrusion toward a neighboring protrusion, the connection plates 514 and 524 and the support plates 515 and 525 are formed.

Figure 7:
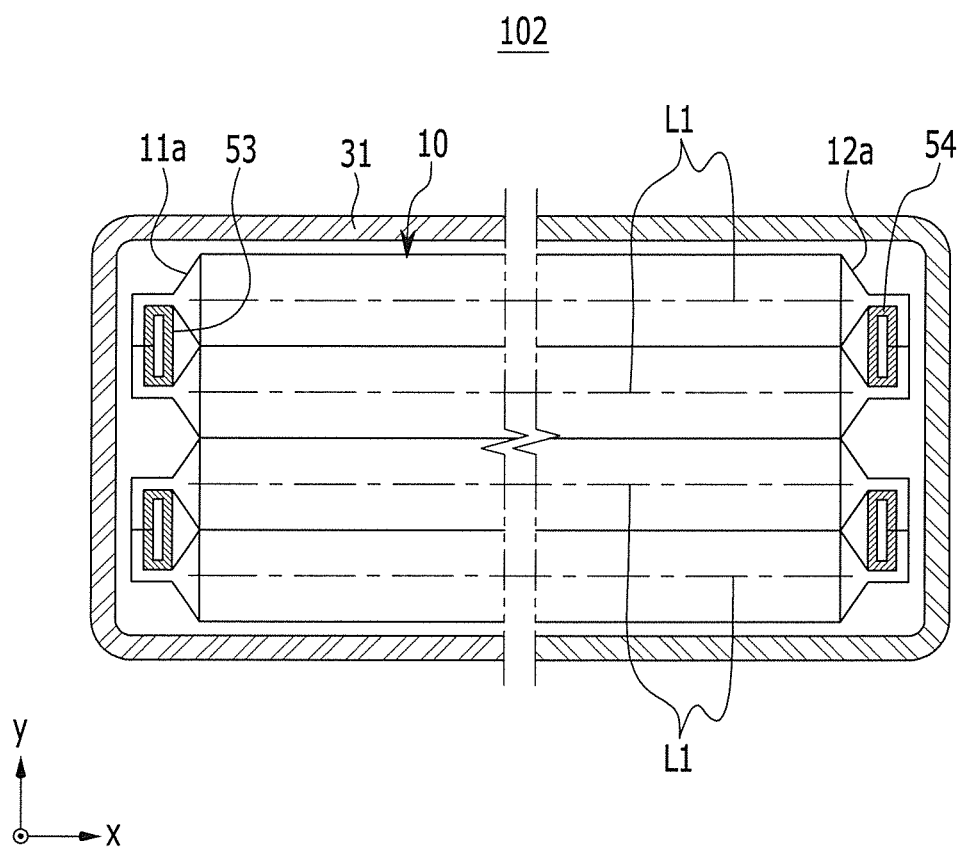
FIG. 7 is a transverse cross-sectional view illustrating a rechargeable battery according to a second exemplary embodiment of the present invention.
Figure 8:
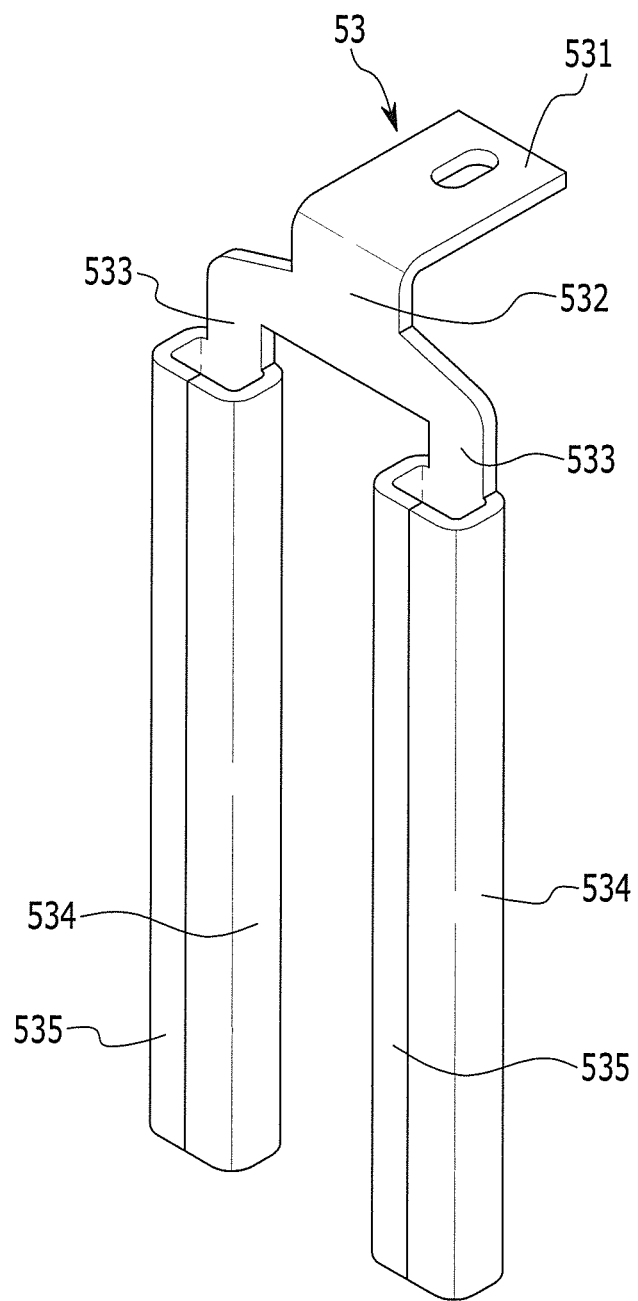
FIG. 8 is a perspective view illustrating a current collecting member of the rechargeable battery according to the second exemplary embodiment of the present invention.

FIG. 7 is a transverse cross-sectional view illustrating a rechargeable battery according to a second exemplary embodiment of the present invention, and FIG. 8 is a perspective view illustrating a current collecting member according to the second exemplary embodiment of the present invention.

Referring to FIGS. 7 and 8, a rechargeable battery 102 according to the present exemplary embodiment includes a case 31, a plurality of electrode assemblies 10 installed within the case 31, and current collecting members 53 and 54 that couple the electrode assembly 10 and a terminal.

The rechargeable battery 102 according to the present embodiment is formed identically or similarly to the rechargeable battery according to the first exemplary embodiment, except for the number of the electrode assemblies 10 and a structure of the current collecting members 53 and 54. Accordingly, description of structure identical or similar to that of the first exemplary embodiment will be omitted.

Four electrode assemblies 10 are installed within the case 31, a positive electrode current collecting member 53 is coupled to a positive uncoated region 11a, and a negative electrode current collecting member 54 is coupled to a negative uncoated region 12a.

The positive electrode current collecting member 53 includes a terminal connection portion 531 fixed to a positive terminal 21, an upper side plate 532 bent from the terminal connection portion 531, two lower side plates 533 coupled at a lower portion of the upper side plate 532 and separated from each other to be coupled to a lower part, a connection plate 534 bent from the lower side plate 533, and a support plate 535 bent from the connection plate 534.

The negative electrode current collecting member 54 is formed in the same structure as that of the positive electrode current collecting member 53, and thus a description of the positive electrode current collecting member 53 replaces a description of the negative electrode current collecting member 54.

The terminal connection portion 531 is formed in a quadrangular plate shape, and a hole, through which the positive terminal 21 is inserted, is formed in the center of the terminal connection portion 531. Further, the terminal connection portion 531 is bonded by welding to a lower portion of the positive terminal 21.

The upper side plate 532 is bent orthogonally toward the bottom of the case 30 in an end portion of a length direction of the terminal connection portion 531. The upper side plate 532 is formed in a height direction of the case 30, and lower side plates 533, which are coupled to the upper side plate 532, are formed at a lower end of the upper side plate 532. Two lower side plates 533 are formed downward from both side ends of the upper side plate 532. The connection plate 534 is coupled to both side ends of the lower side plate 533, is bent vertically from the lower side plate 533, and is parallel to the winding axis L1. The support plate 535 that is vertically bent from the connection plate 534 is formed at the side end of the connection plate 534.

The positive uncoated region 11a and the negative uncoated region 12a are fixed (e.g., fixed by welding) to the connection plate 534 and the support plate 535.

Figure 9:
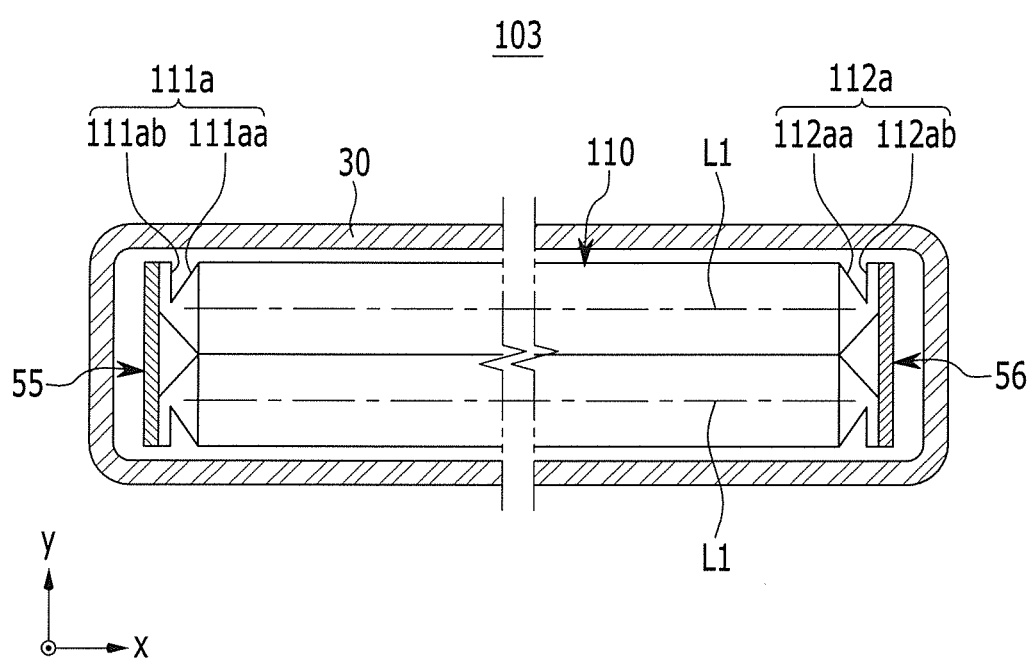
FIG. 9 is a transverse cross-sectional view of a rechargeable battery according to a third exemplary embodiment of the present invention.
Figure 10:
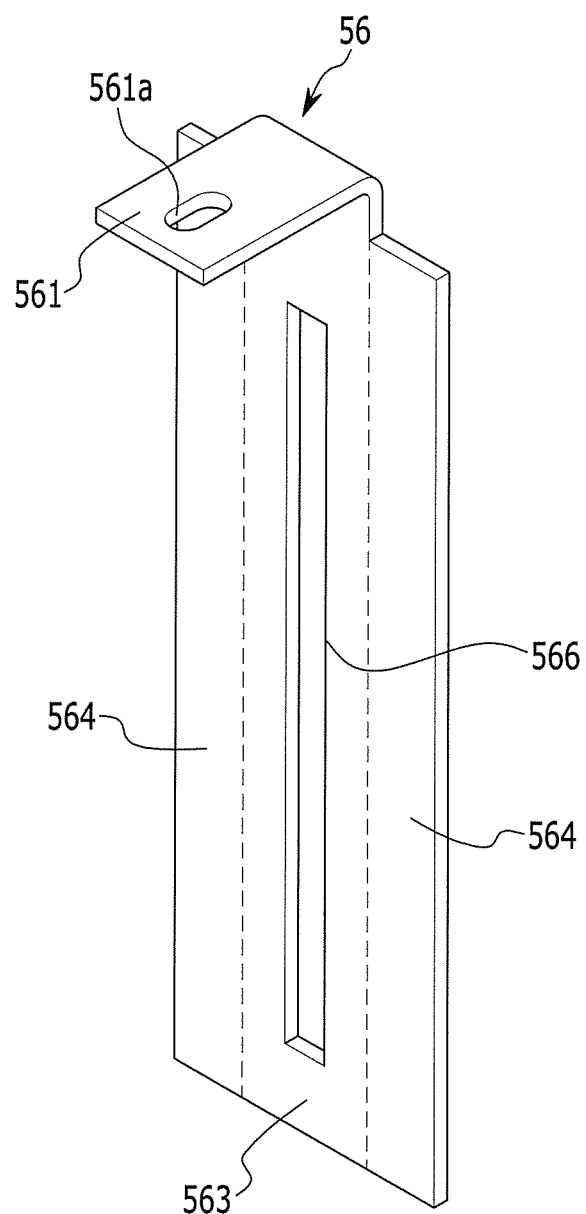
FIG. 10 is a perspective view illustrating a current collecting member of the rechargeable battery according to the third exemplary embodiment of the present invention.

FIG. 9 is a transverse cross-sectional view of a rechargeable battery according to a third exemplary embodiment of the present invention, and FIG. 10 is a perspective view illustrating a current collecting member according to a third exemplary embodiment of the present invention.

Referring to FIGS. 9 and 10, a rechargeable battery 103 according to the present embodiment includes a case 30, a plurality of electrode assemblies 110 installed within the case 30, and current collecting members 55 and 56 that couple the electrode assemblies 110 and a terminal.

The rechargeable battery 103 according to the present embodiment is formed identically or similarly to the rechargeable battery according to the first exemplary embodiment, except for a structure of the electrode assembly 110 and the current collecting members 55 and 56. Accordingly, detailed description of structure identical or similar to that of the first exemplary embodiment will be omitted.

The rechargeable battery 103 according to the present embodiment includes a case 30, a plurality of electrode assemblies 110 installed within the case 30, and current collecting members 55 and 56 that couple the electrode assemblies 110 and a terminal.

Two electrode assemblies 110 are installed within the case 30, the positive electrode current collecting member 55 is coupled to the positive uncoated regions 111a, and the negative electrode current collecting member 56 is coupled to the negative uncoated regions 112a.

The negative electrode current collecting member 56 includes a terminal connection portion 561 that is fixed to a negative terminal, a side plate 563 bent from the terminal connection portion 561 to be coupled to a lower part, and a support plate 564 parallel to the side plate 563.

The terminal connection portion 561 is formed in a quadrangular plate shape, and a hole 561a, through which a protrusion corresponding to a lower end of the negative terminal is inserted, is formed at the center thereof. Further, the terminal connection portion 561 is bonded (e.g., welded) to a lower part of the negative terminal.

The side plate 563 is bent orthogonally toward the bottom of the case 30 at an end portion of a length direction of the terminal connection portion 561. The side plate 563 is formed in a height direction of the case 30, and a hole 566 is formed in the side plate 563. The side plate 563 is parallel to a stacking direction of the electrode assembly 110 and is vertical to the winding axis L1.

The support plate 564 is coupled to both side ends of the side plate 563, and protrudes parallel to the side plate 563 at side ends of the side plate 563. Accordingly, the side plate 563 and the support plate 564 are in the same plane.

The positive electrode current collecting member 55 is formed in the same or similar structure as that of the negative electrode current collecting member 56, and thus a detailed description of the structure that is the same as or similar to that of the negative electrode current collecting member 56 will be omitted.

Figure 11A:
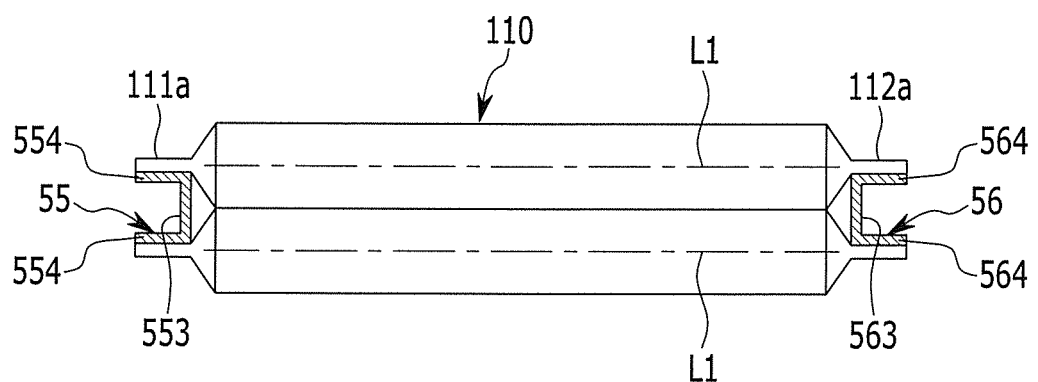
FIG. 11A is a cross-sectional view illustrating a state in which a current collecting member of the rechargeable battery of the third exemplary embodiment of the present invention is coupled to an uncoated region.

As shown in FIGS. 9 and 11A, the positive uncoated region 111a is fixed by welding to the support plate 554. The positive uncoated region 111a includes an inclined surface 111aa formed obliquely toward the center of a width direction of the electrode assembly 10, and a second extension 111ab attached to the support plate 564 and bent to the inclined surface 111aa to cross the winding axis. The second extension 111ab is bent vertically toward the winding axis L1, and is parallel to a side surface of the case 30. The second extensions 111ab of the adjacent electrode assembly 10 are bent toward the outside of the case 30.

The negative uncoated region 112a is fixed (e.g., welded) to the support plate 564, and includes an inclined surface 112aa formed obliquely toward the center of a width direction of the electrode assembly 10, and a second extension 112ab attached to the support plate 564 and bent toward the inclined surface 112aa to cross the winding axis L1. The second extension 112ab is bent vertically to the winding axis L1 and is parallel to a side surface of the case 30. The second extensions 112ab of the adjacent electrode assembly 10 are bent toward the outside of the case 30.

In the present exemplary embodiment, in the uncoated regions 111a and 112a, when the second extensions 111ab and 112ab, which are respectively bent to the inclined surfaces 111aa and 112aa, are formed, and when the support plates 554 and 564, which are respectively coupled to the side end of the side plates 553 and 563, are formed, occupying space of the uncoated regions 111a and 112a and the current collecting members 55 and 56 is reduced or minimized, and output per volume can be significantly improved.

Figure 11B:
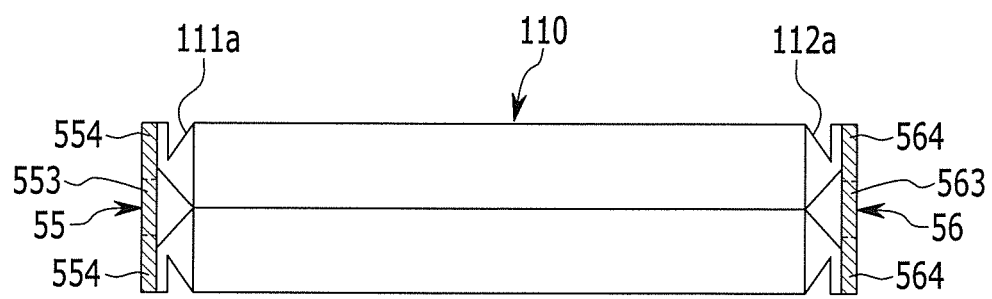
FIG. 11B is a cross-sectional view illustrating a state in which a current collecting member of the rechargeable battery of the third exemplary embodiment of the present invention is unbent.

FIG. 11A is a cross-sectional view illustrating a state in which a current collecting member is coupled to an uncoated region, and FIG. 11B is a cross-sectional view illustrating a state in which a current collecting member is unbent.

A method of installing a current collecting member according to the present exemplary embodiment will be described with reference to FIGS. 11A and 11B. The method of installing the current collecting members 55 and 56 according to the present exemplary embodiment includes respectively inserting the current collecting members 55 and 56 between the uncoated regions 111a and 112a of the neighboring electrode assembly 110, bonding the uncoated regions 111a and 112a to a bent protrusion at both side ends of respective ones of the side plates 553 and 563, and adjusting a protruding angle of an opposite protrusion.

At a step of inserting, the side plates 553 and 563 are inserted between respective ones of the uncoated regions 111a and 112a, and protrusions that respectively protrude from both side ends of the side plates 553 and 563 closely contact the uncoated regions 111a and 112a. In this case, the protrusion is parallel to the uncoated regions 111a and 112a and the winding axis L1.

At a step of bonding, the uncoated regions 111a and 112a and the respective protrusions are bonded (e.g., bonded by ultrasonic welding and/or resistance welding). Next, at a step of adjusting a protruding angle, the side plates 553 and 563 are formed by spreading (e.g., spreading flat, or unbending) a protrusion that is opposite to be parallel to the support plates 554 and 564.

Figure 12:
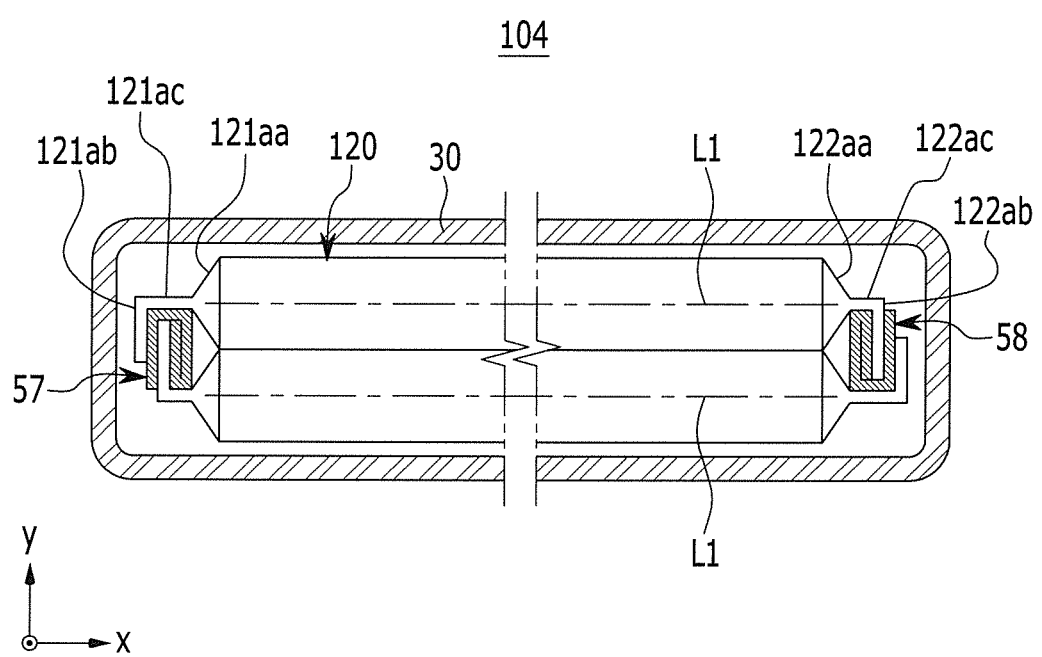
FIG. 12 is a transverse cross-sectional view of a rechargeable battery according to a fourth exemplary embodiment of the present invention.
Figure 13:
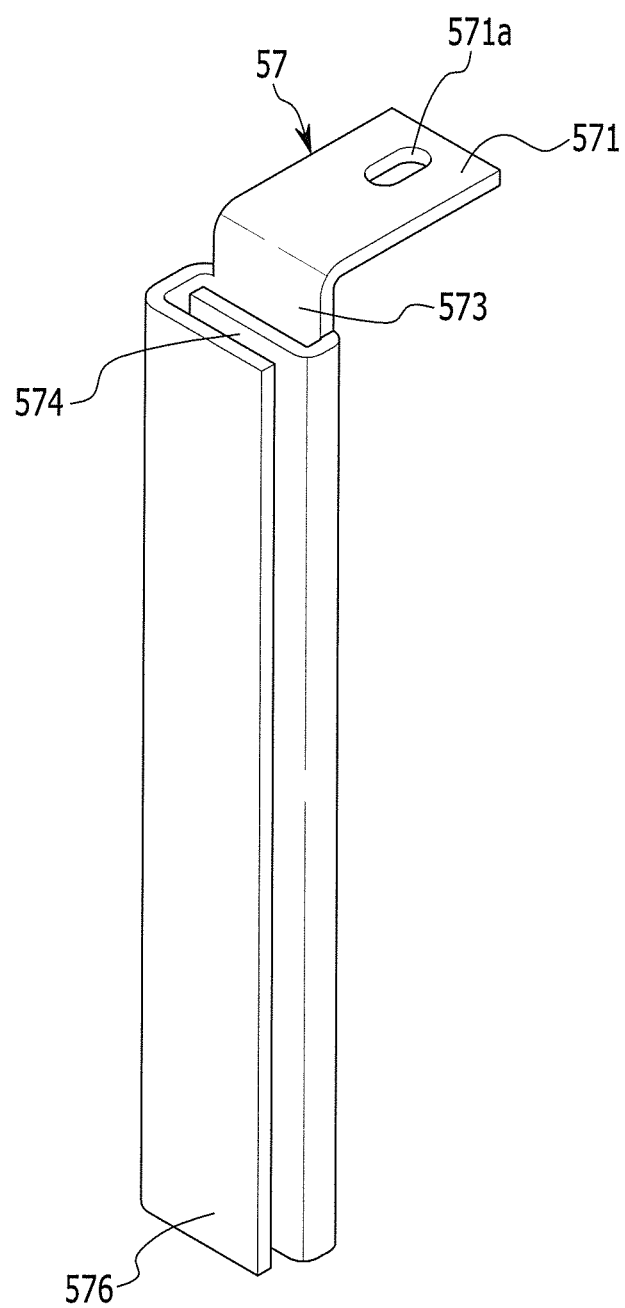
FIG. 13 is a perspective view illustrating a current collecting member of the rechargeable battery according to the fourth exemplary embodiment of the present invention.

FIG. 12 is a transverse cross-sectional view of a rechargeable battery according to a fourth exemplary embodiment of the present invention, and FIG. 13 is a perspective view illustrating a current collecting member according to the fourth exemplary embodiment of the present invention.

Referring to FIGS. 12 and 13, a rechargeable battery 104 according to the present embodiment includes a case 30, a plurality of electrode assemblies 120 installed within the case 30, and current collecting members 57 and 58 that couple the electrode assemblies 120 and a terminal.

The rechargeable battery 104 according to the present embodiment is formed identically or similarly to the rechargeable battery according to the first exemplary embodiment, except for a structure of the electrode assembly 120 and the current collecting members 57 and 58. Accordingly, a description of structure that is identical or similar to that of the first exemplary embodiment will be omitted.

The rechargeable battery 104 according to the present embodiment includes a case 30, a plurality of electrode assemblies 120 within the case 30, and current collecting members 57 and 58 that couple the electrode assembly 120 and a terminal.

In the present embodiment, two electrode assemblies 120 are installed within the case 30, the positive electrode current collecting member 57 is coupled to positive uncoated regions 121a, and the negative electrode current collecting member 58 is coupled to negative uncoated regions 122a.

The positive electrode current collecting member 57 includes a terminal connection portion 571 that is fixed to a positive terminal, a side plate 573 that is bent from the terminal connection portion 571 to be coupled to a lower part, a first support plate 574 that is bent from one side end of the side plate 573 to be parallel to the side plate 573, and a second support plate 576 that is bent from the other side end of the side plate 573 to be parallel to the side plate 573.

The terminal connection portion 571 is formed in a quadrangular plate shape, and a hole 571a, which is for receiving a protrusion corresponding to a lower end of the positive terminal, is formed at the center of the terminal connection portion 571. Further, the terminal connection portion 571 is bonded (e.g., welded) to a lower part of the positive terminal.

The side plate 573 is bent orthogonally toward the bottom of the case 30 in an end portion of a length direction of the terminal connection portion 571. The side plate 573 is formed in a height direction of the case 30, and a hole is formed in the side plate 573.

The first support plate 574 is coupled to one side end of the side plate 573, and the second support plate 576 is coupled to the other side end of the side plate 573. The second support plate 576 is at the outside of the first support plate 574, and thus the first support plate 574 is between the side plate 573 and the second support plate 576.

The side plate 573, the first support plate 574, and the second support plate 576 cross the winding axis L1 (e.g., are perpendicular to the winding axis L1).

One positive uncoated region 121a of an electrode assembly 120 is fixed (e.g., welded) to the first support plate 574, and the other positive uncoated region 121a of the other electrode assembly 120 is fixed (e.g., welded) to the second support plate 576.

The positive uncoated region 121a includes an inclined surface 121aa formed obliquely toward the center of a width direction of the electrode assembly 10, a second extension 121ab coupled to the support plate 574 and bent toward the inclined surface 121aa to cross the winding axis L1, and a first extension 121ac that couples the second extension 121ab and the inclined surface 121aa.

The second extension 121ab is bent to be orthogonal to the winding axis L1 and to be parallel to a side surface of the case 30, and the second extension 121ab of one electrode assembly 120 (e.g., the top electrode assembly 120 in FIG. 12) is at the outside further than (e.g., is closer to the case 30 than) the other second extension 121ab of the neighboring electrode assembly 120 (e.g., the bottom electrode assembly 120 in FIG. 12). Further, the second extension 121ab of the neighboring electrode assembly is between the support plates 574 and 576.

The negative electrode current collecting member 58 is formed in the same structure as that of the positive electrode current collecting member 57 and thus a detailed description of the structure that is the same as that of the positive electrode current collecting member 57 will be omitted.

The negative uncoated region 122a includes an inclined surface 122aa formed obliquely toward a center of a width direction of the electrode assembly 10, a second extension 122ab attached to the support plate 584 or 586 and bent from the inclined surface 122aa to cross the winding axis L1, and a first extension 122ac that couples the second extension 122ab and the inclined surface 122aa.

The second extension 122ab is bent vertically to the winding axis L1 to be parallel to a side surface of the case 30, and the second extension 122ab of one side of the adjacent electrode assembly 10 is at the outside further than the other second extension 122ab of the neighboring electrode assembly 10. Further, the second extension 122ab of one side electrode assembly is inserted between support plates.

As described above, according to the present exemplary embodiment, when an uncoated region is fixed to the support plate, because the support plates are bent and stacked, the uncoated region is located between the support plates to be stably fixed, and by reducing a volume of the uncoated region and the current collecting member, output per volume can be improved.

Figure 14A:
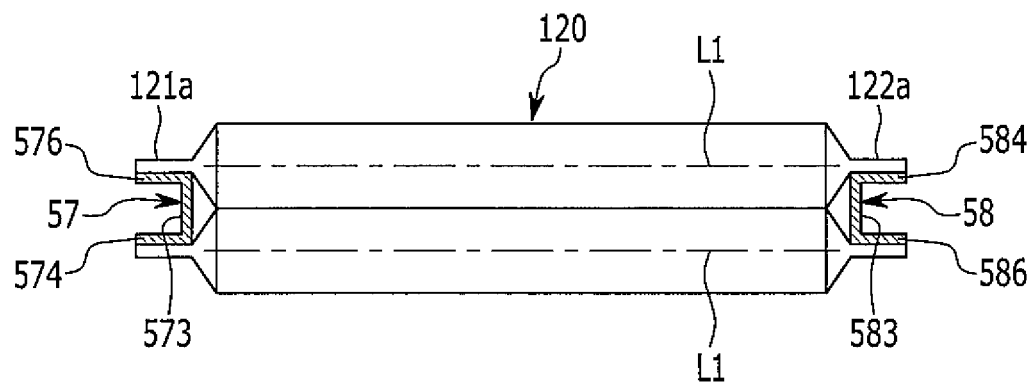
FIG. 14A is a cross-sectional view illustrating a state in which a current collecting member of the rechargeable battery according to the fourth exemplary embodiment of the present invention is coupled to an uncoated region.
Figure 14B:
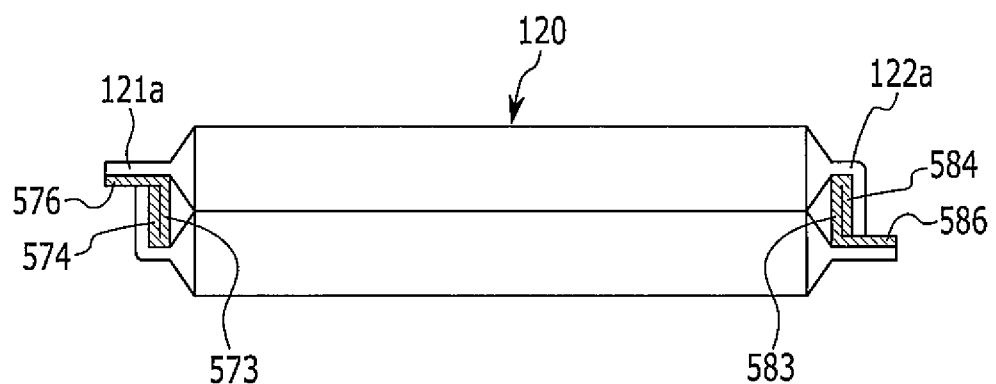
FIG. 14B is a cross-sectional view illustrating a state in which a first support plate of the rechargeable battery according to the fourth exemplary embodiment of the present invention is bent
Figure 14C:
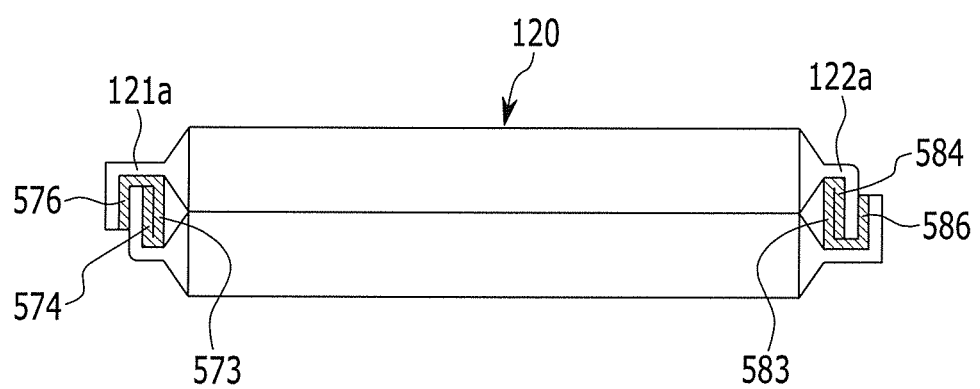
FIG. 14C is a cross-sectional view illustrating a state in which a second support plate of the rechargeable battery according to the fourth exemplary embodiment of the present invention is bent.

FIG. 14A is a cross-sectional view illustrating a state in which a current collecting member is coupled to an uncoated region, FIG. 14B is a cross-sectional view illustrating a state in which a first support plate is bent, and FIG. 14C is a cross-sectional view illustrating a state in which a second support plate is also bent.

A method of installing a current collecting member according to the present embodiment will be described with reference to FIGS. 14A and 14C. The method of installing current collecting members 57 and 58 according to the present exemplary embodiment includes inserting the current collecting members 57 and 58 between respective ones of the uncoated regions 121a and 122a of the neighboring electrode assemblies 120, bonding the uncoated regions 121a and 122a to the bent protrusions at both side ends of the side plates 573 and 583, and adjusting protruding angles of opposite protrusions.

At a step of inserting, the side plates 573 and 583 are respectively inserted between the uncoated regions 121a and 122a, and protrusions at both side ends of the side plates 573 and 583 closely contacts the uncoated regions 121a and 122a, respectively. In this case, the protrusions are parallel to the uncoated regions 121a and 122a and the winding axis L1.

At a step of bonding, the uncoated regions 121a and 122a and the protrusions are respectively bonded (e.g., bonded by ultrasonic welding and/or resistance welding). Next, a step of adjusting a protruding angle of a protrusion includes a step of bending the first support plates 574 and 584 and the corresponding protrusion toward respective ones of the side plates 573 and 583, and a step of bending the second support plates 576 and 586 to form a stacked structure with the first support plates 574 and 584.

The first support plates 574 and 584 are bent toward the neighboring second support plates 576 and 586, and the second support plates 576 and 586 are bent to be stacked with the first support plates 574 and 584. Accordingly, the side plates 573 and 583, the first support plates 574 and 584, and the second support plates 576 and 586 are stacked.

While embodiments of the present invention have been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and their equivalents.

Description of Some of the Reference Characters 101, 102, 103, 104: rechargeable battery
10, 110, 120: electrode assembly
11: positive electrode  11a, 111a, 121a: positive uncoated region
12: negative electrode
12a, 112a, 122a: negative uncoated region
13: separator  20: cap assembly
21: positive terminal  22: negative terminal
23: seal stopper  24: first gasket
25: cap plate  26: second gasket
27: vent member  29: nut
30, 31: case  11aa, 111aa, 112aa: inclined surface
11ab, 111ab, 112ab, 121ab: second extension
11ac, 121ac: first extension
51, 53, 55, 57: positive electrode current collecting member
52, 54, 56, 58: negative electrode current collecting member
512, 521, 531, 561, 571: terminal connection portion
513, 523, 553, 563, 573, 583: side plate
514, 524, 534: connection plate
515, 525, 535, 554, 564: support plate
532: upper side plate  533: lower side plate
574, 584: first support plate  576, 586: second support plate

The invention claimed is:

1. A rechargeable battery comprising:
a plurality of electrode assemblies each comprising a positive electrode and a negative electrode, each of the positive and negative electrodes comprising a coated region and an uncoated region at an end of the coated region in a longitudinal direction of the electrode assembly;
a case housing the electrode assemblies;
a terminal coupled to the electrode assemblies; and
a current collecting member electrically coupling the electrode assemblies to the terminal,
wherein the current collecting member comprises:
a side plate extending in a direction substantially perpendicular to the longitudinal direction of the electrode assemblies, a length of the side plate being along the direction substantially perpendicular to the longitudinal direction of the electrode assemblies, and the length of the side plate being greater than a width of the side plate; and a plurality of support plates respectively extending from opposite sides of the side plate and each having a surface that is substantially parallel to the side plate, the opposite sides of the side plate extending in the length direction of the side plate, and wherein an end portion of each of the uncoated regions extends substantially perpendicular to the longitudinal direction of the electrode assemblies and is coupled to the support plates.

2. The rechargeable battery of claim 1, wherein the uncoated regions are welded to the support plates.

3. The rechargeable battery of claim 1, wherein each of the uncoated regions comprises:
    an inclined surface at an end of one of the electrodes of one of the electrode assemblies;
    a first extension extending from a peak of the inclined surface in the longitudinal direction of the electrode assembly; and
    a second extension extending from the first extension in a direction substantially perpendicular to the longitudinal direction of the electrode assembly.

4. The rechargeable battery of claim 1, wherein each of the support plates are bent from the side plate, and
    wherein the support plates and the side plate are integrally formed.

5. The rechargeable battery of claim 1, wherein the support plates and the side plate form a tube having a substantially rectangular cross-section.

6. The rechargeable battery of claim 1, wherein the current collecting member further comprises a terminal connection portion having a hole for accommodating the terminal.

7. The rechargeable battery of claim 6, wherein the terminal connection portion extends from the side plate in a direction substantially perpendicular to the side plate, substantially perpendicular to the support plates, and substantially parallel to the longitudinal direction of the electrode assembly.

8. The rechargeable battery of claim 6, wherein the terminal connection portion, the side plate, and the support plates are integrally formed.

9. The rechargeable battery of claim 1, wherein the side plate has an opening.

10. The rechargeable battery of claim 9, wherein the opening of the side plate is substantially rectangular and extends in a longitudinal direction of the side plate.

11. The rechargeable battery of claim 1,
    wherein the plurality of support plates comprises:
        a first support plate extending from a first side of the side plate; and
        a second support plate extending from a second side of the side plate opposite the first side,
    wherein the first support plate is bent from the side plate to be substantially parallel to the side plate, and
    wherein the second support plate is bent from the side plate to be substantially parallel to the side plate and to substantially overlap the first support plate in the longitudinal direction of the electrode assemblies.

12. The rechargeable battery of claim 1, wherein the side plate comprises a first prong and a second prong,
    wherein the plurality of support plates comprises:
        a first support plate coupled to and bent from the first prong, the first support plate and the first prong having a tube-like structure; and
        a second support plate coupled to and bent from the second prong, the second support plate and the second prong having a tube-like structure.

* * * * *